(12) United States Patent
Safavi

(10) Patent No.: US 12,088,453 B2
(45) Date of Patent: Sep. 10, 2024

(54) NETWORK ANOMALY DETECTION AND MITIGATION

(71) Applicant: Juniper Networks, Inc., Sunnyvale, CA (US)

(72) Inventor: Ebrahim Safavi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/060,910

(22) Filed: Dec. 1, 2022

(65) Prior Publication Data

US 2024/0187302 A1    Jun. 6, 2024

(51) Int. Cl.
*H04L 41/0631* (2022.01)
*H04L 41/0681* (2022.01)
*H04L 41/0816* (2022.01)
*H04L 41/147* (2022.01)
*H04L 41/16* (2022.01)

(52) U.S. Cl.
CPC ........ *H04L 41/064* (2013.01); *H04L 41/0681* (2013.01); *H04L 41/0816* (2013.01); *H04L 41/147* (2013.01); *H04L 41/16* (2013.01)

(58) Field of Classification Search
CPC .............. H04L 41/064; H04L 41/0681; H04L 41/0816; H04L 41/147; H04L 41/16
See application file for complete search history.

(56) References Cited

U.S. PATENT DOCUMENTS

| | | | |
|---|---|---|---|
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,832,082 B2 | 11/2017 | Dade et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |

(Continued)

FOREIGN PATENT DOCUMENTS

| | | |
|---|---|---|
| AU | 2020201136 A1 | 9/2020 |
| WO | 2020142390 A1 | 7/2020 |

(Continued)

OTHER PUBLICATIONS

Extended Search Report from counterpart European Application No. 23154391.9 dated Aug. 17, 2023, 14 pp.

*Primary Examiner* — Philip C Lee
(74) *Attorney, Agent, or Firm* — Shumaker & Sieffert, P.A.

(57) ABSTRACT

A network management system may detect congestion and other network problems, identify the root cause of the issue and invoke remedial actions. The network management system may collect a time series of network data from various devices in the network. The network management system may use the collected network data to determine metrics indicating whether the network is experiencing congestion and/or anomalies, and if so, what is the root cause. Once the root cause is identified an automated and/or manual corrective action may take place.

16 Claims, 13 Drawing Sheets

(56) References Cited

U.S. PATENT DOCUMENTS

| | | | |
|---|---|---|---|
| 10,992,543 B1 | 4/2021 | Rachamadugu et al. | |
| 11,075,824 B2 | 7/2021 | McCulley et al. | |
| 2021/0160263 A1* | 5/2021 | Jiang | H04L 43/08 |
| 2021/0203563 A1* | 7/2021 | George | G06N 5/045 |
| 2021/0306201 A1* | 9/2021 | Wang | G05B 23/0294 |
| 2022/0337495 A1 | 10/2022 | Safavi | |
| 2022/0417106 A1* | 12/2022 | Wozich | H04L 41/147 |

FOREIGN PATENT DOCUMENTS

| | | |
|---|---|---|
| WO | 2020150564 A1 | 7/2020 |
| WO | 2021118526 A1 | 6/2021 |

* cited by examiner

NETWORK ANOMALY DETECTION AND MITIGATION

TECHNICAL FIELD

The disclosure relates generally to computer networks and, more specifically, to monitoring and troubleshooting computer networks.

BACKGROUND

Networks may have communication issues for a variety of reasons. For example, anomalies such as erroneous configuration or malfunctioning components may cause network congestion or network performance issues. Typically, if there is a network error, users will complain about the network problem, and then an information technology (IT) technician may need to debug the network in order to find the offending configuration or the offending components and fix it. Waiting for an IT technician to correct the issue may subject network users to prolonged sub-par network performance, leading to user dissatisfaction. The need for a skilled IT technician to resolve configuration issues and anomalies may make the resolving network anomalies costly.

SUMMARY

In general, this disclosure describes one or more techniques for detecting congestion and other network problems, identifying the root cause of the issue and invoking remedial actions in a timely, efficient and cost-effective manner. A network management system may collect a time series of network data from various devices in the network. The network management system (NMS) may use the collected network data to determine metrics indicating whether the network is experiencing congestion and/or anomalies, and if so, what is the root cause. Once the root cause is identified an automated and/or manual corrective action may take place. The network management system may collect statistics from network devices, incorporate the collected statistics into vectors, and aggregate these vectors. The network management system may process aggregated time series of network data using artificial intelligence (AI) based machine learning (ML) models to detect anomalies in the network that are indicative of network degradation that may impact the service level experience of users.

The ML models may be trained using an unsupervised ML process. In some aspects, the ML model is trained based on ongoing measured network statistics. The NMS may predict the next measured values based on the historical values and when the measured value deviates from the predicted value by more than a dynamic AI learned threshold, the AI system may declare an anomaly event. In addition to detecting the anomaly, the system may identify a) the period of time in which the anomaly occurred, and b) the vector components that triggered the anomaly detection. Once an anomaly is detected, the system may identify the problem device and take corrective actions. Identifying the device may use spatial or temporal analysis of the network data.

The systems and methods described herein may provide technical advantages over existing systems. For example, the systems and methods described herein may reduce the time to detect a data traffic issues. They may also drastically reduce required computation by examining the network as a whole rather than examining the operations of each device separately. Only when an anomaly is detected will the system invoke additional resources for performing a more computationally intensive analysis of each individual device of the network to identify the offending component.

In one example, the disclosure is directed to a method comprising receiving, at a computing device from a plurality of network devices, in a network, network data collected by the plurality of network devices; determining, from the network data, a time series of statistics; aggregating, at the computing device, the time series of statistics from the plurality of network devices to produce aggregated statistics; evaluating, at the computing device, the aggregated statistics to determine an anomaly in the network, the anomaly having an associated anomaly time period; and in response to determining the anomaly in the network, determining, at the computing device, that at least one network device of the plurality of network devices is related to the anomaly using a subset of the time series of statistics collected during the associated anomaly time period.

In another example, the disclosure is directed to a computing device comprising a memory, and one or more processors coupled to the memory and configured to receive from a plurality of network devices in a network statistics collected by the plurality of network devices; aggregate the statistics from the plurality of network devices to produce aggregated statistics; evaluate the aggregated statistics to determine an anomaly within a network, the anomaly having an associated anomaly time period; and determine that at least one network device of the plurality of network devices is related to the anomaly using the statistics collected by the plurality of network devices during the associated anomaly time period.

In yet another example, the disclosure is directed to a non-transitory computer-readable storage medium having instructions stored thereon that, when executed, cause one or more processors to receive from a plurality of network devices in a network, statistics collected by the plurality of network devices; aggregate the statistics from the plurality of network devices to produce aggregated statistics; evaluate the aggregated statistics to determine an anomaly within the network, the anomaly having an associated anomaly time period; and determine that at least one network device of the plurality of network devices is related to the anomaly using the statistics collected by the plurality of network devices during the associated anomaly time period.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
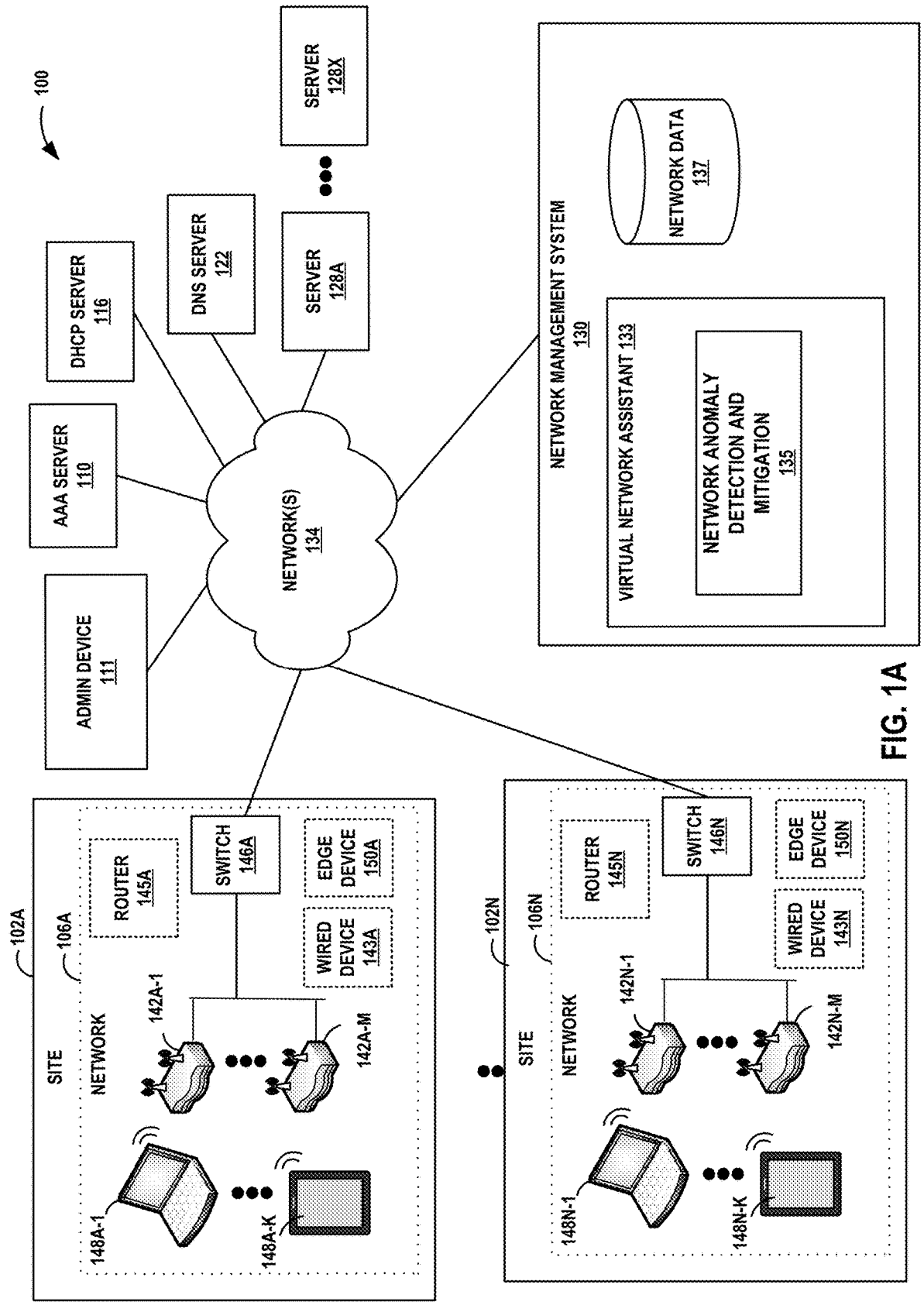
FIG. 1A is a block diagram of an example network system including a network management system, in accordance with one or more techniques of the disclosure.

FIG. 1A is a block diagram of an example network system 100 including network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network devices including network access server (NAS) devices, such as access points (APs) 142, switches 146, or routers 145, as well as wired devices 143. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to a wired network and is capable of providing wireless network access to client devices within the site.

Each site 102A-102N also includes network devices such as client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other devices connected to the wired network and configured to communicate over one or more wireless networks 106. Wired device 143 may be any computing device that is part of a wired network.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network (s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers 145, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by, operated by, and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level experience (SLE) values or metrics, received from wireless networks 106A-106N at each site 102A-102N, respectively, and manages network resources, such as APs 142 and other network devices at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

Within a network, misconfigured network devices are common. Such misconfigured network devices may result in suboptimal performance. For example, erroneous configuration or a malfunctioning component may cause network congestion. Other problems with network devices, such as defective network devices, may also result in lowered performance.

As discussed above, previously, network performance problems were determined by the users themselves. Slow network performance would result in user complaints at which point an information technology (IT) technician would then debug the network to find the offending configuration or the offending components and fix it. Waiting for an IT technician to correct the issue subjects network users to a prolonged sub-par network performance. Plus, the need for a skilled IT technician makes the solution costly.

Monitoring the network devices for problems may be difficult when there is a large number of network devices. The computational power to analyze all of the statistics of each network device separately using techniques such as artificial intelligence may be significant.

The network management system 130 may ease the computational burden by breaking the monitoring into two steps 1) determining if the network as a whole has a problem and then 2) if the network as a whole has a problem, determining specific network devices that are likely to be causing the problem.

In accordance with one or more techniques of this disclosure, NMS 130 using network anomaly detection and mitigation module 135 may detect congestion and/or network anomalies as soon as they happen, identify the root cause of the anomaly, and invoke remedial actions. Remedial actions may involve automatic messages to IT technicians, automatic restarts of network devices, and changes in configuration. In one example, NMS 130 perform one or more of changing the configuration of a network device, changing the software version of the network device, or restarting the network device or a component of the network device In this way, NMS 130 using network anomaly detection and mitigation module 135 may improve network performance automatically rather than wait for users to be impacted and complain to an IT technician.

NMS 130 using network anomaly detection and mitigation module 135 may be configured to receive network data collected by network devices. The network devices may be all or a subset of the network devices in a network. This network data may be statistics or other data related to the network's operation at a network device. Example statistics include number of packets or frames received and transmitted, dropped packets or frames and malformed received packets and frames, among others.

NMS 130 using network anomaly detection and mitigation module 135 may determine, from the network data, a time series of statistics. For example, NMS 130 using network anomaly detection and mitigation module 135 may produce a vector of multiple statistics for each network device. An k-sized vector may be created from k statistics collected for each network device for multiple time periods resulting a time series of k-sized vectors for each network device.

NMS 130 using network anomaly detection and mitigation module 135 may aggregate the time series of statistics from the plurality of network devices to produce aggregated statistics. The aggregation may include functions such as addition, averages, minimums, maximums, standard deviations, variances, medians, or other values alone or in combination. The aggregation allows for the whole network to be checked for anomalies. Abnormal operations at a single or small number of network devices may often be noticeable when aggregated into an aggregated statistic. This is especially the case for serious problems that affect the whole network.

If the number of packets input into a network goes up, the throughput of the network should be increasing. If there is huge demand and the throughput of the network is not increasing, an anomaly may be determined. In addition, if an error rate goes up without the traffic load going up, an anomaly may be determined.

NMS 130 using network anomaly detection and mitigation module 135 may evaluate the aggregated statistics to determine an anomaly in the network, the anomaly having an associated anomaly time period. As described below, a machine learning model may be used to detect an anomaly in the network and the associated anomaly time period. For example, a machine learning model may produce a future estimate of certain statistics based on past statistics. For example, a machine learning model may produce an estimate of dropped packets based on based on an incoming packet volume. Such correlations and estimates may be learned by the machine learning model based on historical operations.

NMS 130 using network anomaly detection and mitigation module 135 may determine that at least one network device of the plurality of network devices is related to the anomaly using a subset of the time series of statistics collected during the associated anomaly time period. NMS 130 using network anomaly detection and mitigation module 135 may use a machine learning model to determine which network devices have abnormal statistics during the associated anomaly time period.

The techniques of this disclosure provide one or more technical advantages and practical applications. For example, the techniques may reduce the time to detect network anomalies. Additionally, the techniques may also drastically reduce required computation by initially examining the network as a whole rather than examining the operations of each network device separately. Only when an anomaly is detected will the system invoke additional resources for performing a more computationally intensive analysis of each individual component of the network to identify the offending component. The method may use a hybrid of unsupervised and supervised AI methods to train machine learning models. The unsupervised method is used to train a model to identify anomalous network behavior that may impact customer's system level experience, and the supervised methods are used to train the system about potential remedial actions. The techniques provide an automated method for detecting network anomalies and identifying the offending components. In some cases, an automated mitigation action may be invoked.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
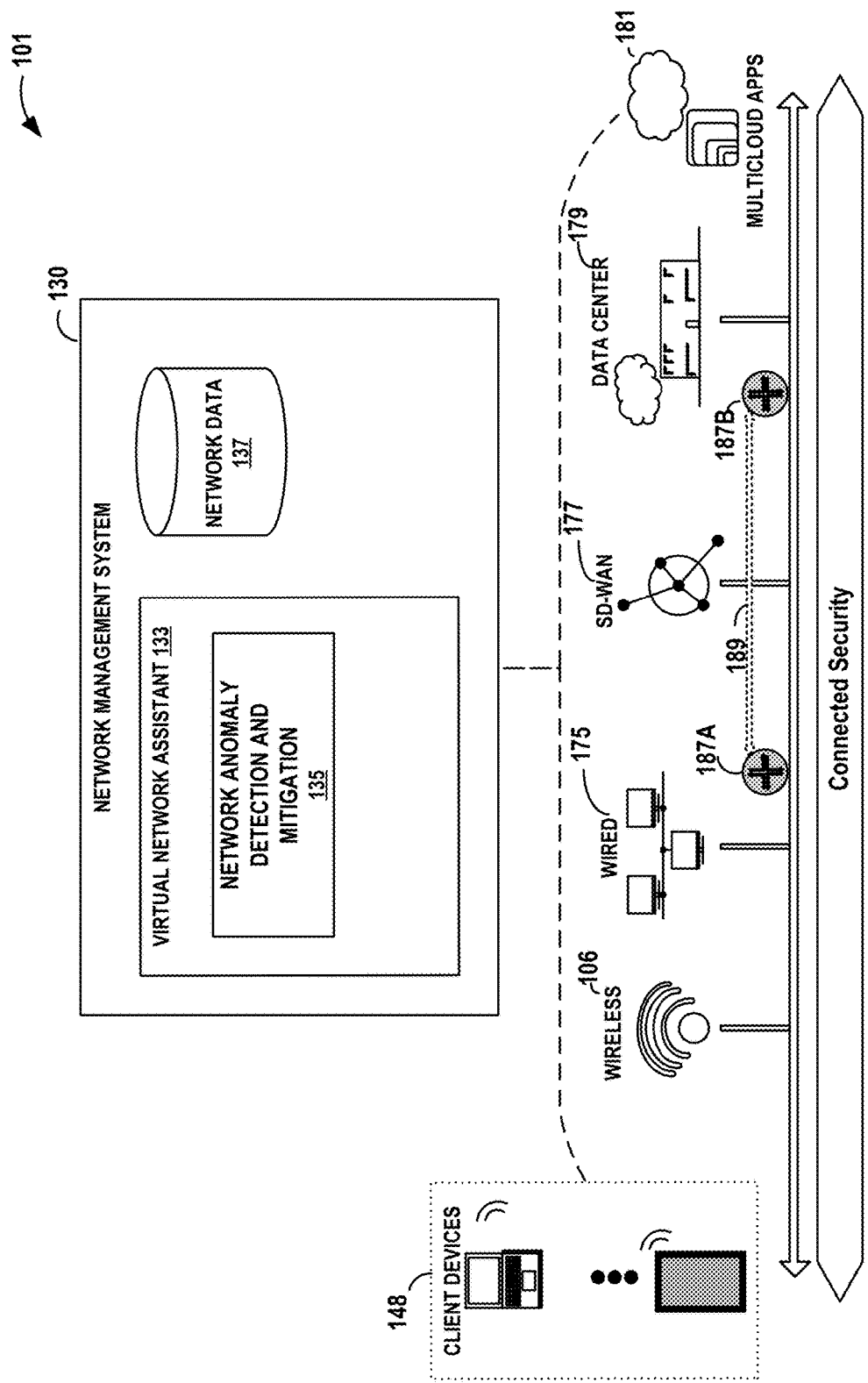
FIG. 1B is a block diagram illustrating further example details of the network system of FIG. 1A, in accordance with one or more techniques of the disclosure.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (Wi-Fi Assurance, wired and wireless LAN assurance and WAN assurance) spanning from "client," e.g., user devices 148 connected to wireless network 106 and wired LAN 175 (far left of FIG. 1B), routers and switches (not shown for sake of simplicity) to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 101, which may be similar to network 100 of FIG. 1A, so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
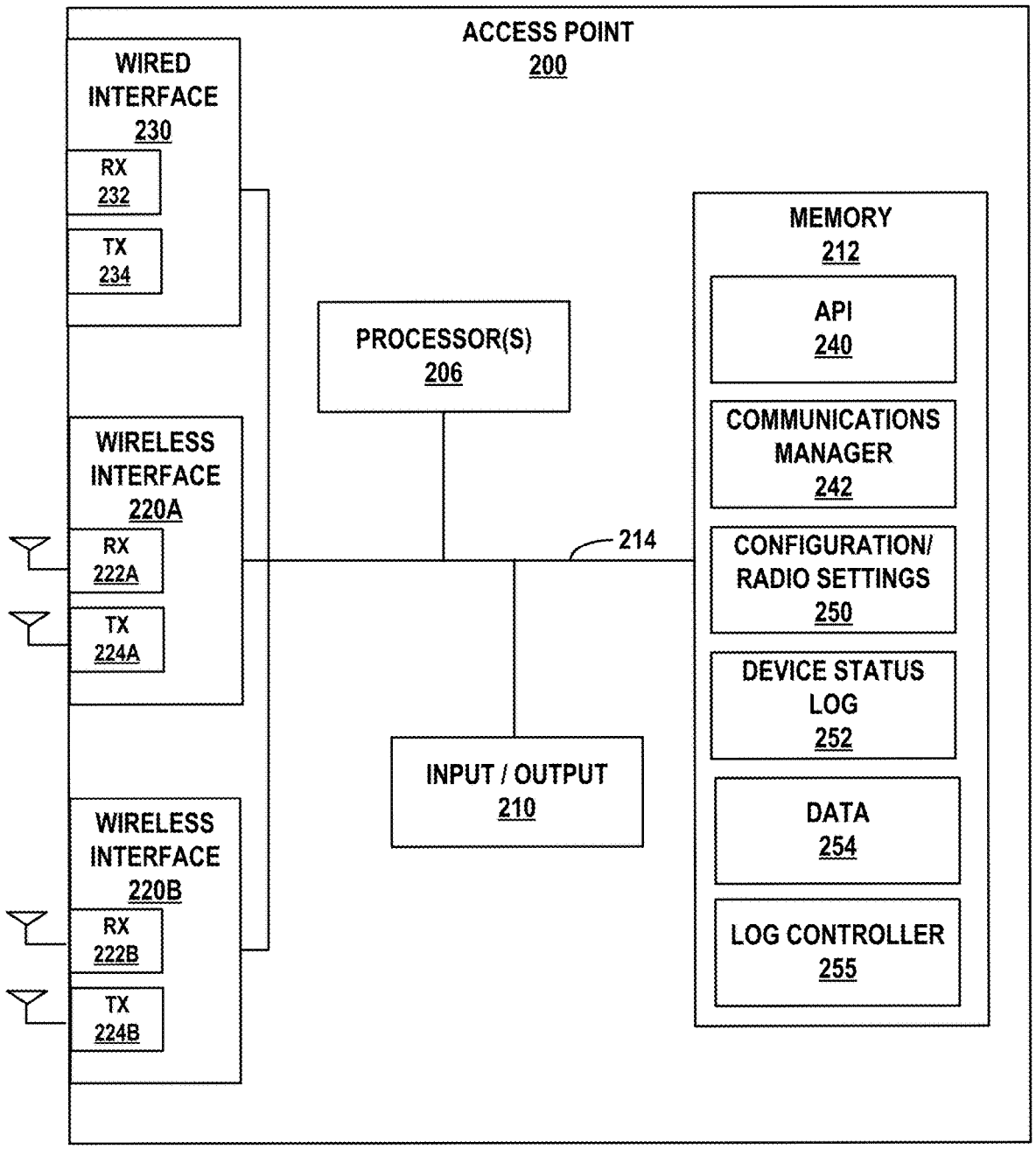
FIG. 2 is a block diagram of an example access point device, in accordance with one or more techniques of this disclosure.

FIG. 2 is a block diagram of an example access point (AP) device 200, in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHZ) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252, data storage 254, and log controller 255. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis. Network(s) 134 may comprise a wide area network (WAN) with Networks 106 comprising a local area network (LAN).

As described herein, AP device 200, as well as switches and routers, may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1A).

Log controller 255 may be used to collect statistics for the techniques disclosed in this disclosure when the AP device 200 is one of the network devices of the network being monitored. The AP device 200 may then provide the statistics to the NMS 130 for analysis. Other network devices, such as switches and routers, may also provide the statistics to the NMS 130 for analysis.

Figure 3:
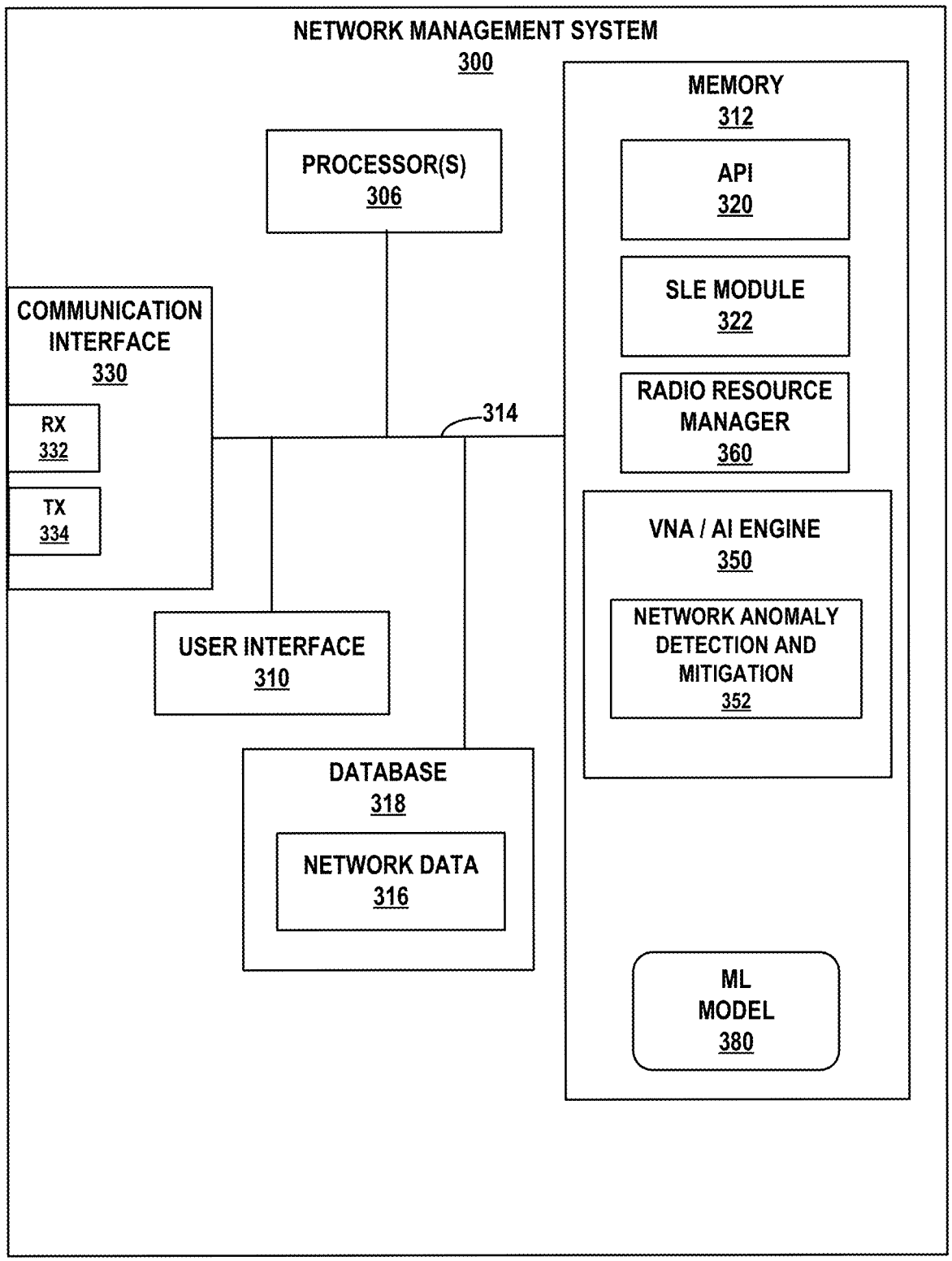
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource management (RRM) engine 360. In accordance with the disclosed techniques, VNA/AI engine 350 includes network anomaly detection and mitigation module 352. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as any of APs 142 from UEs in each wireless network 106A-106N as well as SLE metrics for wired network devices such as switches 146, routers 187 and other wired network devices of network 175. For example, APs 142A-1 through 142A-N, switches 147, routers 187 collect SLE-related data from UEs 148A-1 through 148A-N and wired devices currently connected to wireless network 106A and wired network 175. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to adjust the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include reconfiguring a switch and/or a router, restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

In accordance with one or more techniques of this disclosure, network anomaly detection and mitigation module 352 may be used to detect and mitigate anomalies in the network. As discussed elsewhere in the disclosure, the network anomaly detection and mitigation module 352 may receive, aggregate, and analyze statistics from network devices. Network anomaly detection and mitigation module 352 may be part of VNA/AI engine. Network anomaly detection and mitigation module 352 may use one or more machine learning (ML) models 380. ML models 380 may be used to determine predicted component values for aggregated vectors, threshold values to be compared to the predicted value and mitigation steps.

In some examples, ML model 380 may comprise a supervised ML model that is trained, using training data comprising pre-collected, labeled network data received from network devices (e.g., client devices, APs, switches and/or other network nodes), to identify network anomalies and perform operations to mitigate the network anomalies. The supervised ML model may comprise one of a logistical regression, naïve Bayesian, support vector machine (SVM), or the like. In other examples, ML model 380 may comprise an unsupervised ML model, such as a ML model trained to determine predicted component values for aggregated vectors. Although not shown in FIG. 3, in some examples, database 318 may store the training data and VNA/AI engine 350 or a dedicated training module may be configured to train ML model 380 based on the training data to determine appropriate weights across the one or more features of the training data.

Network anomaly detection and mitigation module 352 may receive statistics from network devices such as switches, routers, and APs. Network anomaly detection and mitigation module 352 may store the statistics in database 318. In one example, k statistics for each monitored network device are collected at multiple time periods to form a time series of statistics for each network device.

Network anomaly detection and mitigation module 352 may then aggregate the time series of statistics for each network device to form an aggregated time series of statistics for the network as a whole. The aggregation may include functions such as addition, averages, minimums maximums, standard deviations, variances, medians or other values alone or in combination.

Network anomaly detection and mitigation module 352 may then use the aggregated time series of statistics to determine if the network is undergoing an anomaly such as network congestion. In one example, ML model 380 may be used to predict future values of the aggregated time series of statistics and network anomaly detection and mitigation module 352 may then compare the predicted values to real values to determine an anomaly. For example, if the predicted value is different from the real value more than a threshold amount, an anomaly may be determined.

Network anomaly detection and mitigation module 352 may then use the statistic (out of the k monitored statistics) to determine which network device was contributing to the anomaly. Network anomaly detection and mitigation module 352 may analyze the time series of statistics for each network device during an anomaly period for the statistic that was found to contribute to the anomaly. In addition to detecting the anomaly, network anomaly detection and mitigation module 352 may identify the period of time in which the anomaly occurred, and the statistic, or vector component, that triggered the anomaly detection.

Network anomaly detection and mitigation module 352 may then perform a more detailed analysis for a subset of the time series of relevant statistics that were collected during the anomaly time period to determine which network or network devices contributed to the anomaly.

Two different approaches to that to identify network devices contributing to a network anomaly are discussed below: one relying on spatial analysis and the other on temporal analysis. In the spatial method, network anomaly detection and mitigation module 352 may sum the time series of statistics for each network device over the anomaly period to obtain a single representative value for each network device. Network anomaly detection and mitigation module 352 may use a previously identified specific component of the vector that contributed to identifying the anomaly. Network anomaly detection and mitigation module 352 may then determine which one of the devices contributed more to the identified anomaly. For example, as discussed below in more detail, network anomaly detection and mitigation module 352 may calculate the mutual information coefficient between the component representative value for the network and each one of the representative values of each network device.

The temporal method examines the behavior of a statistic over time in the anomaly period. Network anomaly detection and mitigation module 352 may determine that the network device with the corresponding time series that exhibits the highest correlation with the network aggregated time series during the anomaly period may be identified as the offending network device.

After the network device is identified, network anomaly detection and mitigation module 352 may initiate an action to be done with respect to the network device. For example, network anomaly detection and mitigation module 352 may automatically reconfigure or restart the network device. Alternately, a notice to an IT technician may be sent regarding the network device.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
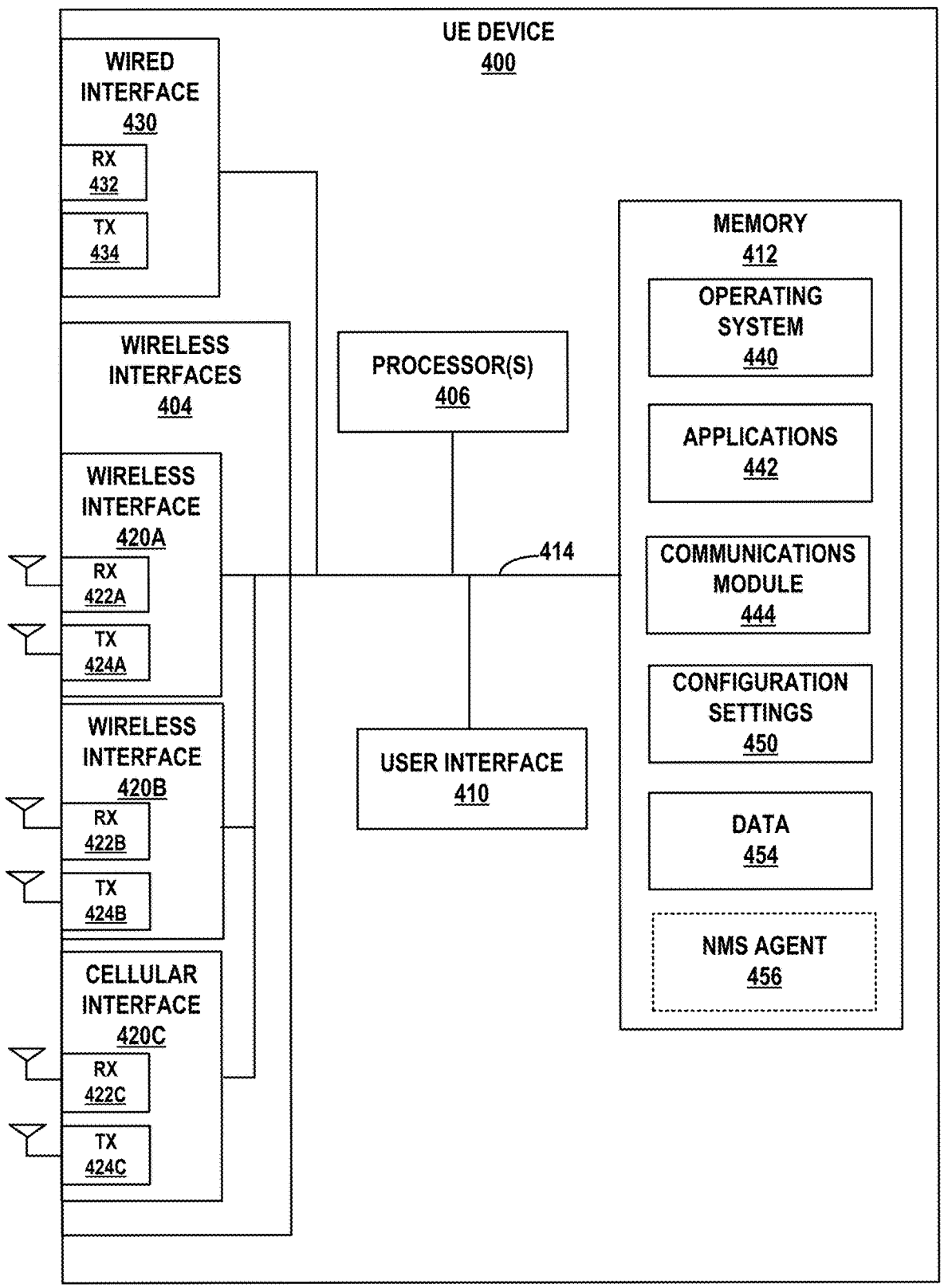
FIG. 4 is a block diagram of an example user equipment device, in accordance with one or more techniques of this disclosure.

FIG. 4 shows an example user equipment (UE) device 400, in accordance with one or more techniques of this disclosure. Example UE device 400 shown in FIG. 4 may be used to implement any of UEs 148 as shown and described herein with respect to FIG. 1A or alternatively a wired client device. UE device 400 may include any type of wired or wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In some examples, UE 400 may also include a wired client-side device, e.g., an IoT device such as a printer, a security sensor or device, a desktop computer, VoIP phone, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data storage 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network.

Optionally, UE device 400 may include an NMS agent 456. NMS agent 456 is a software agent of NMS 130 that is installed on UE 400. In some examples, NMS agent 456 may be implemented as a software application running on UE 400. NMS agent 456 collects information including detailed client-device properties from UE 400, including insight into UE 400 roaming behaviors. The information provides insight into client roaming algorithms because roaming is a client device decision. In some examples, NMS agent 456 may display the client-device properties on UE 400. NMS agent 456 sends the client device properties to NMS 130, via an AP device to which UE 400 is connected. NMS agent 456 may be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 may store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi or wired experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 may display the Radio Hardware and Firmware information of UE 400 received from NMS client agent 456. The more details the NMS agent 456 may draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device may control whether the NMS agent 456 is enabled to report client device information to the NMS.

In some cases, the UE 400 may be a monitored network device that provides statistics to the NMS using NMS agent 456. In other cases, the UE 400 does not provide such statistics if the UE 400 is considered unlikely to be the cause of network anomalies.

UE 400 may also be used as part of a distributed or edge computing where some analysis is performed at the edge. UE 400 may also be part of a hybrid architecture where calculations are performed partially at the edge and partially at a centric cloud based NMS.

Figure 5:
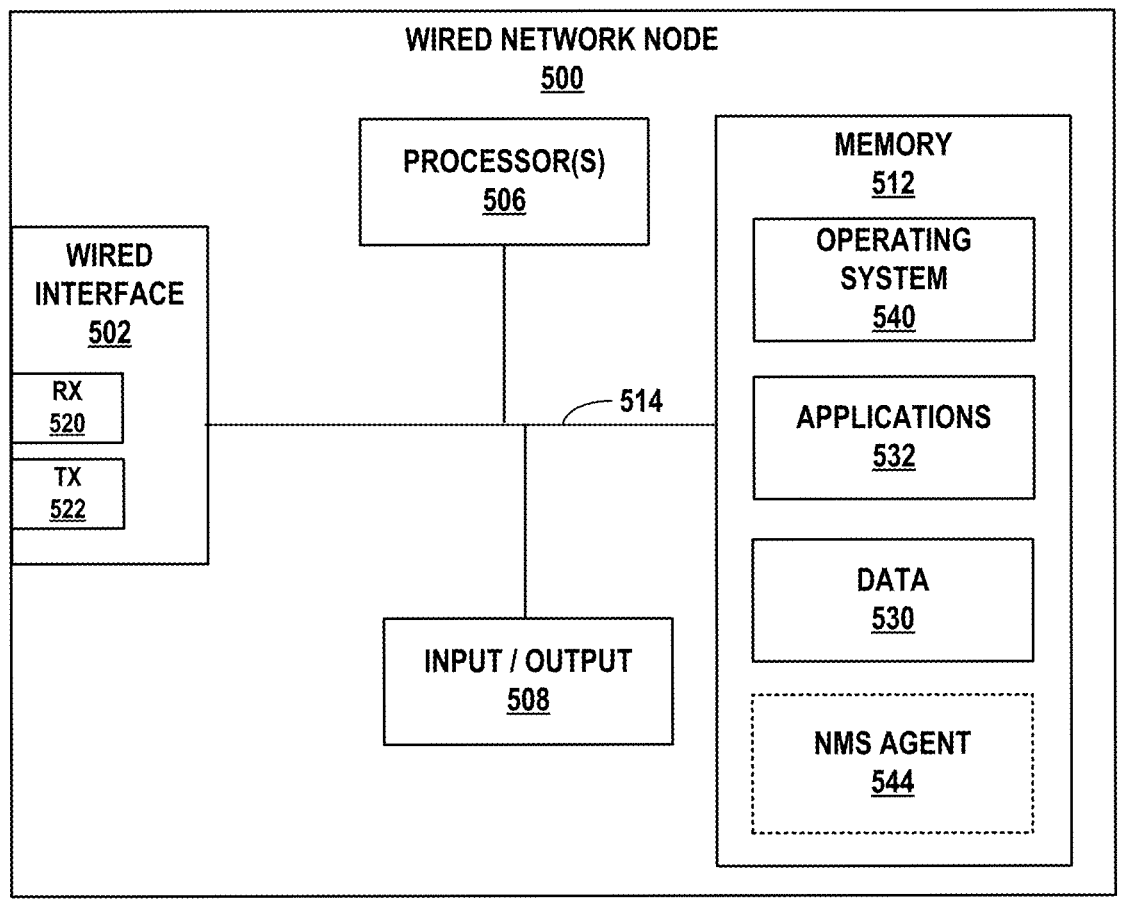
FIG. 5 is a block diagram of an example network node, such as a router or switch, in accordance with one or more techniques of this disclosure.

FIG. 5 is a block diagram illustrating an example network node 500, in accordance with one or more techniques of this disclosure. In one or more examples, the network node 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network node 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540 and data/information 530. Data 530 may include a system log and/or an error log that stores event data, including behavior data, for network node 500. In examples where network node 500 comprises a "third-party" network device, the same entity does not own or have access to both the APs or wired client-side devices and network node 500. As such, in the example where network node 500 is a third-party network device, NMS 130 does not receive, collect, or otherwise have access to the network data from network node 500.

In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., IoT devices. For example, network node 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network node 500 may access the wired network via wired interface 502 of network node 500. In some examples, one or more of the APs or other wired client-side devices connected to network node 500 may each draw power from network node 500 via the respective Ethernet cable and a Power over Ethernet (PoE) port of wired interface 502.

In examples where network node 500 comprises a session-based router that employs a stateful, session-based routing scheme, network node 500 may be configured to independently perform path selection and traffic engineering. The use of session-based routing may enable network node 500 to eschew the use of a centralized controller, such as an SDN controller, to perform path selection and traffic engineering, and eschew the use of tunnels. In some examples, network node 500 may implement session-based routing as Secure Vector Routing (SVR), provided by Juniper Networks, Inc. In the case where network node 500 comprises a session-based router operating as a network gateway for a site of an enterprise network (e.g., router 187A of FIG. 1B), network node 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network node 500, operating as a session-based router, may collect data at a peer path level, and report the peer path data to NMS 130.

In examples where network node 500 comprises a packet-based router, network node 500 may employ a packet- or flow-based routing scheme to forward packets according to defined network paths, e.g., established by a centralized controller that performs path selection and traffic engineering. In the case where network node 500 comprises a packet-based router operating as a network gateway for a site of an enterprise network (e.g., router 187A of FIG. 1B), network node 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network node 500, operating as a packet-based router, may collect data at a tunnel level, and the tunnel data may be retrieved by NMS 130 via an API or an open configuration protocol or the tunnel data may be reported to NMS 130 by NMS agent 544 or another module running on network node 500.

In examples where network node 500 comprises a router or a switch, the router and or a switch may include ingress and egress buffers and a routing module (not shown).

The data collected and reported by network node 500 may include periodically-reported data and event-driven data. Network node 500 is configured to collect logical path statistics via bidirectional forwarding detection (BFD) probing and data extracted from messages and/or counters at the logical path (e.g., peer path or tunnel) level. In some examples, network node 500 is configured to collect statistics and/or sample other data according to a first periodic interval, e.g., every 3 seconds, every 5 seconds, etc. Network node 500 may store the collected and sampled data as path data, e.g., in a buffer.

In some examples, network node 500 optionally includes an NMS agent 544. NMS agent 544 may periodically create a package of the statistical data according to a second periodic interval, e.g., every 3 minutes. The collected and sampled data periodically-reported in the package of statistical data may be referred to herein as "oc-stats." In some examples, the package of statistical data may also include details about clients connected to network node 500 and the associated client sessions. NMS agent 544 may then report the package of statistical data to NMS 130 in the cloud. In other examples, NMS 130 may request, retrieve, or otherwise receive the package of statistical data from network node 500 via an API, an open configuration protocol, or another of communication protocols. The package of statistical data created by NMS agent 544 or another module of network node 500 may include a header identifying network node 500 and the statistics and data samples for each of the logical paths from network node 500. In still other examples, NMS agent 544 reports event data to NMS 130 in the cloud in response to the occurrence of certain events at network node 500 as the events happen. The event-driven data may be referred to herein as "oc-events." NMS 130 may collect the statistics and data samples and use the collected and sampled data to detect network anomalies as discussed below.

Figure 6A:
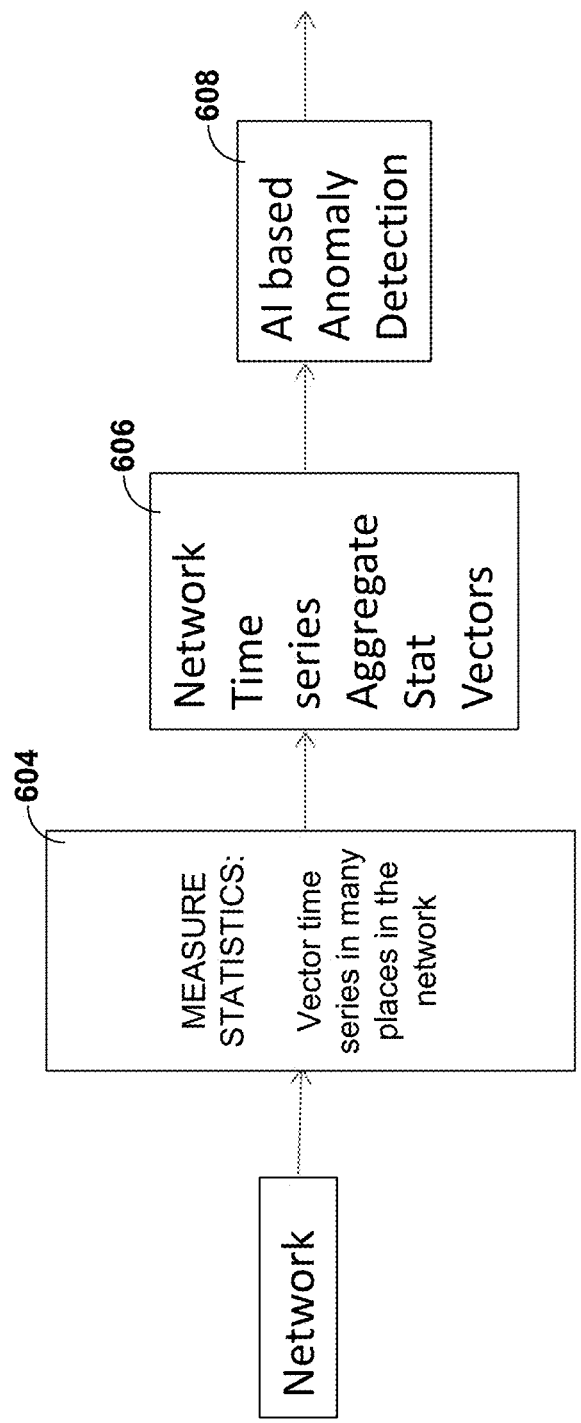
FIG. 6A is a conceptual diagram that illustrates an example operation flow to detect network anomalies, in accordance with one or more techniques of this disclosure.

FIG. 6A is a conceptual diagram that illustrates an example operation flow to detect network congestion and anomalies, in accordance with one or more techniques of this disclosure. In an example, NMS 130 using network anomaly detection and mitigation module 135 may monitor network statistics collected from network devices, as shown at operation 604. The monitored network devices may be all or a selected set of network devices in the network. For example, network devices that are in key locations or have significant traffic flow such that they are strategically important may be selected. The network devices may include but are not limited to devices such as routers, switches, and access points.

In a non-limiting example, NMS 130 using network anomaly detection and mitigation module 135 may collect the following statistics from a plurality of network devices:

stats=['rx_packets', 'rx_errors', 'rx_undersize_errors', 'tx_oversize_errors', 'rx_fcserrors', 'rx_overrun_errors', 'rx_mcast_packets', 'rx_bcast_packets', 'rx_l2_channel_error', 'rx_fifo_errors', 'rx_resource_errors', 'rx_ucast_packets', 'tx_packets', 'tx_errors', 'tx_mtuerrors', 'tx_mcast_packets', 'tx_bcast_packets', 'tx_ucast_packets']

where:

rx/tx_packets—Number of packets received/transmitted by the switch-ports rx/tx_errors—Malformed received/transmitted frames from the switch-ports rx_undersize_errors—Malformed received frames from the switch-ports due to the undersize error rx_oversize_errors—Malformed received frames from the switch-ports due to the oversize error tx_fcserrors—Malformed received frames from the switch-ports due to the FCS error rx_overrun_errors—Malformed received frames when the buffer gets full and the kernel isn't able to empty it rx/tx_mcast_packets—Number of multicast packets received/transmitted by the switch-ports rxitx_bcast_packets—Number of broadcast packets received/transmitted by the switch-ports rx_l2_channel_error—Malformed received frames from the switch-ports due to Layer 2 error tx_fifo_errors—Number of dropped packets per queue
rx_resource_errors—Malformed received frames from the switch-ports due to resource issues
rx/ix_ucast_packets—Number of unicast packets received/transmitted by the switch-ports
tx_mtuerrors—The number of packets whose size exceeded the interface maximum transmission unit (MTU)

These eighteen (18) statistics are discussed as an example, but it is understood that other statistics or sets of statistics may be used. NMS 130 may use the statistics collected over time to form a time series of statistics. The time series of statistics may be used to determine whether the network is experiencing a congestion issue or an anomaly and if so, determine the root cause of the congestion or anomaly. Once the root cause is identified, an automated and/or manual corrective action may take place.

As a machine learning engine builds the model, the machine learning engine may give lower weights to less relevant statistics during the machine learning training. Statistics that are less relevant may be ignored or removed from the system and no longer collected.

Network devices may collect the statistics periodically and send the statistics to NMS 130, for processing. NMS 130 may select some or all of the statistics received from a network device for inclusion in a vector of k elements (e.g., such as the 18 dimensions in this example), and the periodic measurement produces a time series of vectors, each with k elements from each network device that is used for measuring the network performance.

As shown in box 606, NMS 130 using network anomaly detection and mitigation module 135 may aggregate the vectors from the network devices into a single vector. The aggregation may include functions such as addition, averages, minimums maximums, standard deviations, variances, medians or other values alone or in combination.

As shown in box 608, the aggregated time series of vectors may then be used to detect an anomaly in the network. For example, NMS 130 using network anomaly detection and mitigation module 135 may apply an artificial intelligence (AI) based machine learning (ML) system to the aggregated time series of vectors to detect anomalies in the network behavior that are indicative of network degradation that may impact the service level experience of users.

The anomaly detection may be based on a machine learning model that is trained using an unsupervised ML process. In some aspects, the machine learning model may be trained using a history of previously collected network data. In some aspects, the machine learning model may be modified by ongoing training of the ML model based on an ongoing measured network statistics. NMS 130 using the machine learning model may predict the next measured values based on the historical values and when the measured value deviates from the predicted value by more than a dynamic AI learned threshold, NMS 130 may declare an anomaly event for the network as a whole. In addition to detecting the anomaly, NMS 130 may identify a) the period of time in which the anomaly occurred, and b) the vector components that triggered the anomaly detection. NMS 130 may then perform a more detailed analysis for a subset of the time series of statistics that were collected during the anomaly time period to determine which network or network devices contributed to the anomaly. Further details on this analysis are provided below with respect to FIG. 6B.

Figure 6B:
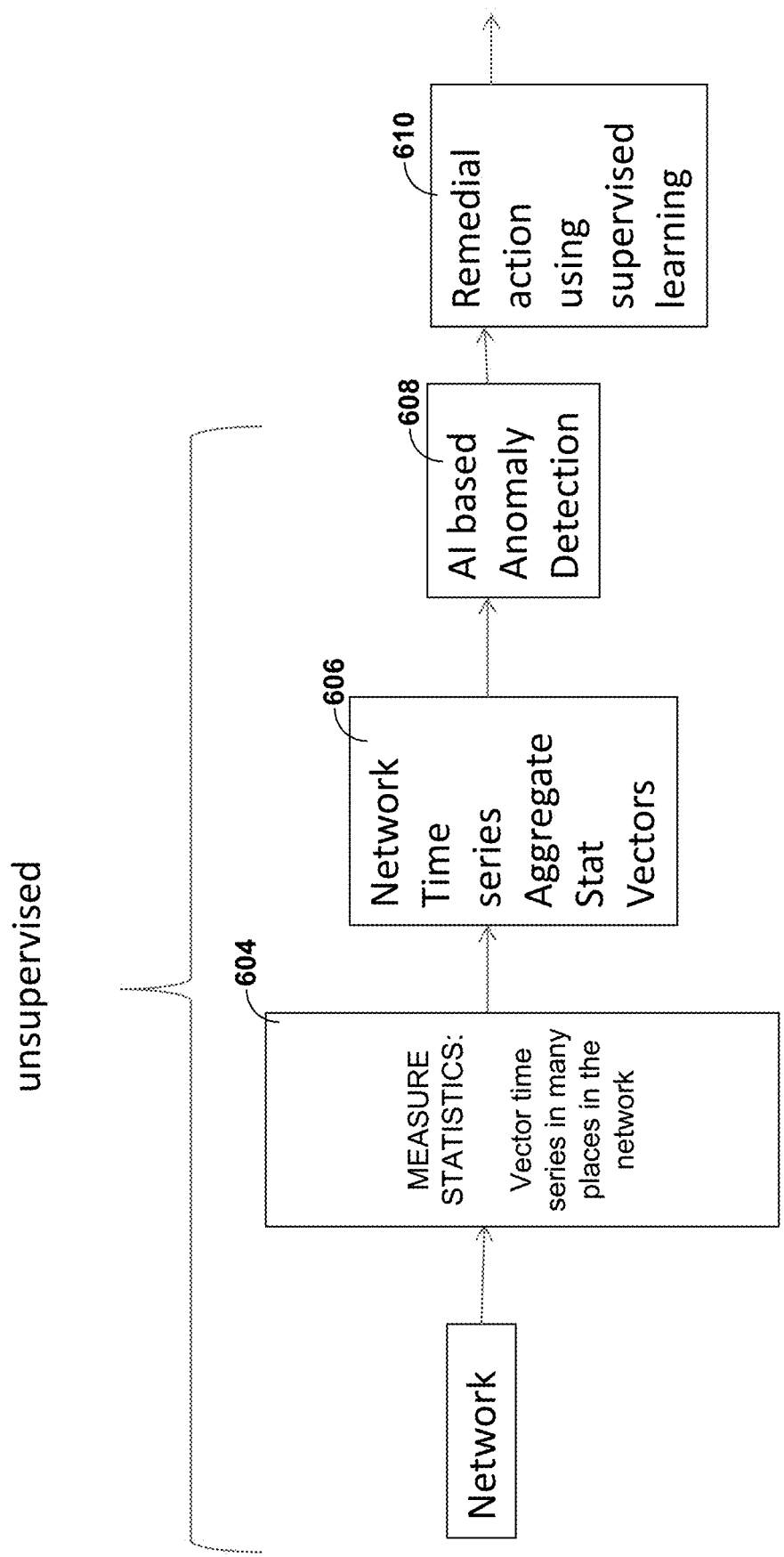
FIG. 6B is a conceptual diagram that illustrates an example operation flow to do remedial action in response to detecting a network anomaly, in accordance with one or more techniques of this disclosure.

FIG. 6B is a conceptual diagram that illustrates an example operation flow to do remedial action in response to detecting a network anomaly, in accordance with one or more techniques of this disclosure. In box 610, once NMS 130 determines an anomaly, NMS 130 may identify the offending component and take corrective actions. Supervised machine learning is usually used to train the model on the appropriate remedial action that needs to take place in response to identifying the offending device and the nature of the issue. Two different approaches to that may be used by NMS 130 to identify network devices contributing to a network anomaly are discussed below: one relying on spatial analysis and the other on temporal analysis.

Figure 7:
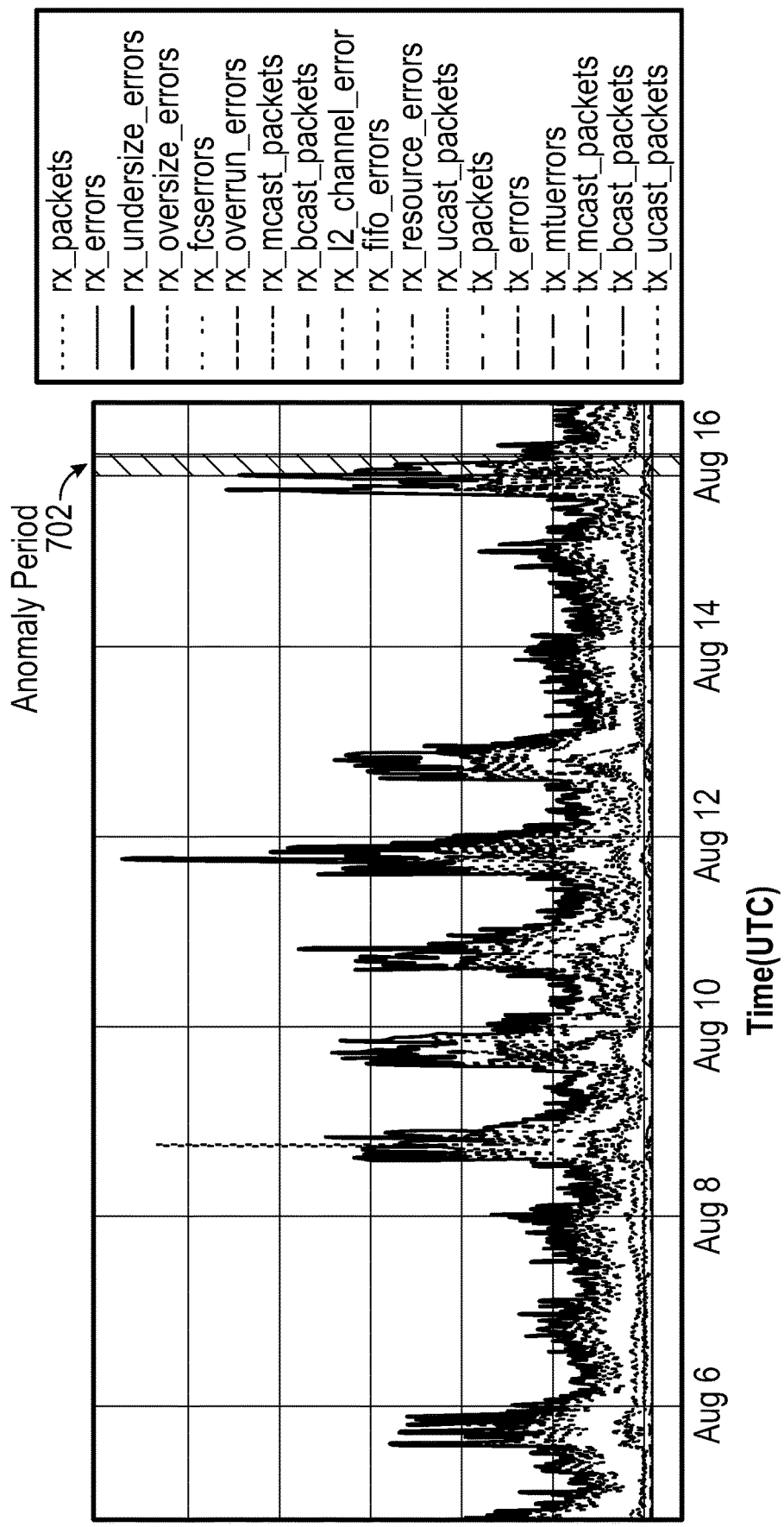
FIG. 7 is a graph of an example anomaly period detected in a network, in accordance with one or more techniques of this disclosure.

FIG. 7 is a graph of an example anomaly period detected in a network, in accordance with one or more techniques of this disclosure. The graph of FIG. 7 shows a variety of aggregated statistics, with each statistic represented as a different band in the graph, and a detected anomaly period 702. The graph of FIG. 7 provides context for the discussion of the spatial and temporal methods discussed below.

In the spatial method, NMS 130 may sum the time series of vector component values of a relevant statistic for each network device over the anomaly period (e.g., anomaly period 702) to obtain a single representative value for each network device. NMS 130 may use a previously identified specific component of the vector that was identified for the anomaly. NMS 130 may then determine which one of the devices contributed more to the identified anomaly. For example, NMS 130 may calculate the mutual information coefficient between the component representative values for the network and each one of the representative values of each network device. Mutual information of two values is a measure of the mutual dependence between the two values. In general, it quantifies the amount of information obtained about one value by observing the other value. Such a mutual information analysis may be done for a statistic that was found to be abnormal in an earlier step. In this case, mutual information may indicate how close the probability distribution of an aggregated statistic of the whole network for the anomaly period is to the probability distribution of the statistics of each network device. This allows for a network device contributing to a failure to be identified. Once the network device is identified, a corrective measure may be taken based on the specific network device that contributed to the anomaly.

Figure 8:
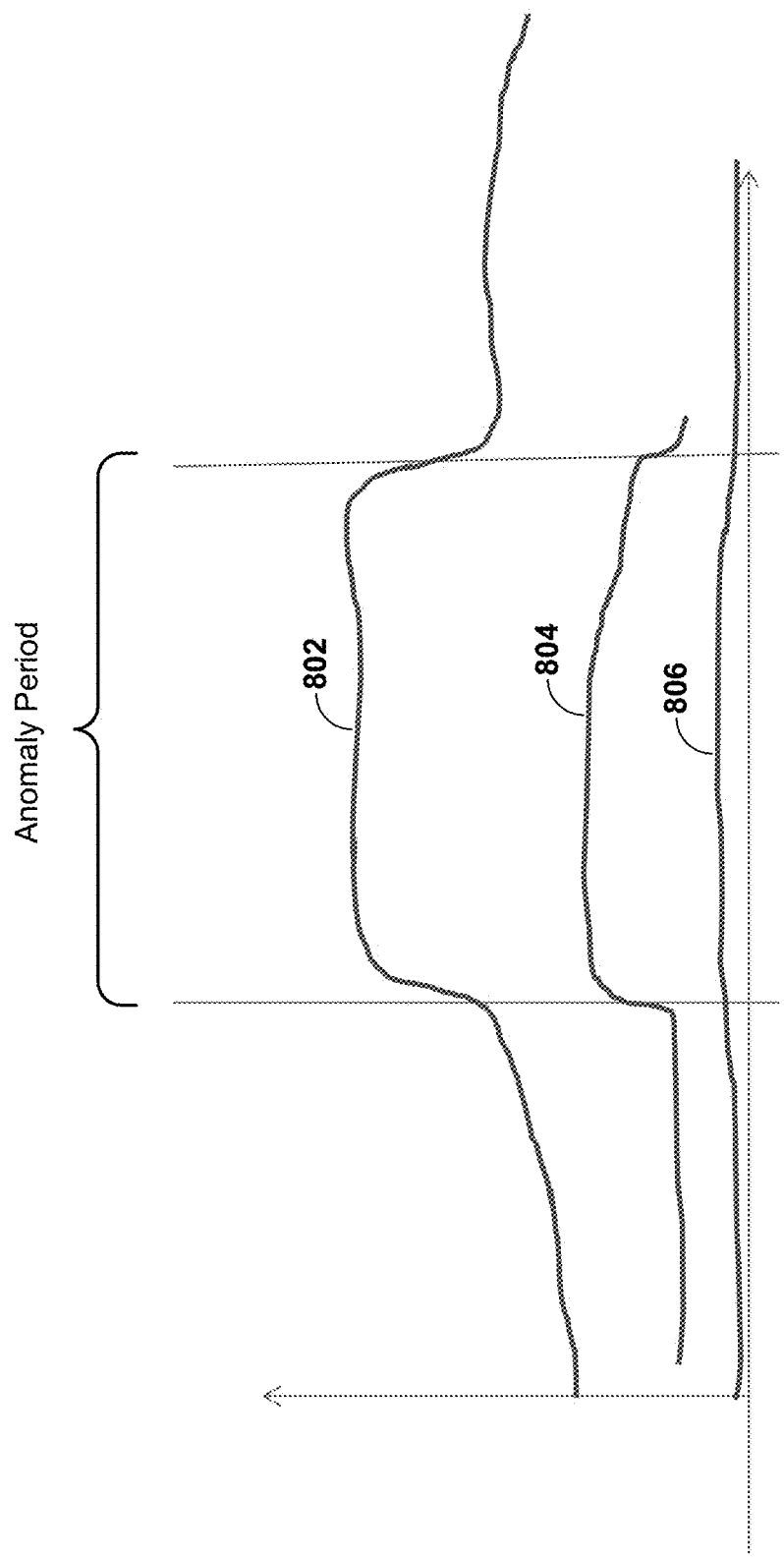
FIG. 8 is a graph of an example anomaly period detected in a network with a graph of a statistic for a network device, in accordance with one or more techniques of this disclosure.

FIG. 8 is a graph of an example anomaly period detected in a network with a graph of a statistic for a network device, in accordance with one or more techniques of this disclosure. The temporal method examines the behavior of the coefficient, which highlighted the anomaly, over time. Looking at FIG. 8 in the anomaly period, NMS 130 may retrieve the values of all the component values during the anomaly period. NMS 130 may then correlate each one of the time series corresponding to each network device with the aggregated network time series. The network device with the corresponding time series that exhibits the highest correlation with the network aggregated time series may be identified as the offending network device. Once the network device is identified, a corrective measure may be taken based on the specific network device that contributed to the anomaly In FIG. 8, line 802 illustrates a statistic, such as an error rate, of the network as a whole. Line 804 illustrates an aggregated statistic, such as the error rate, at a first network device over time. Line 806 illustrates the statistic, such as the error rate, at a second network device over time. As shown in this example, the shape of the curve of line 802 for the network as a whole is more correlated to the shape of the curve of the line 804 for the first device than to the shape of the curve of line 806 for the second network device. In this way, NMS 130 may use the correlation to determine that the first network device contributed to the anomaly and therefore determine that it is the main offender.

Figure 9:
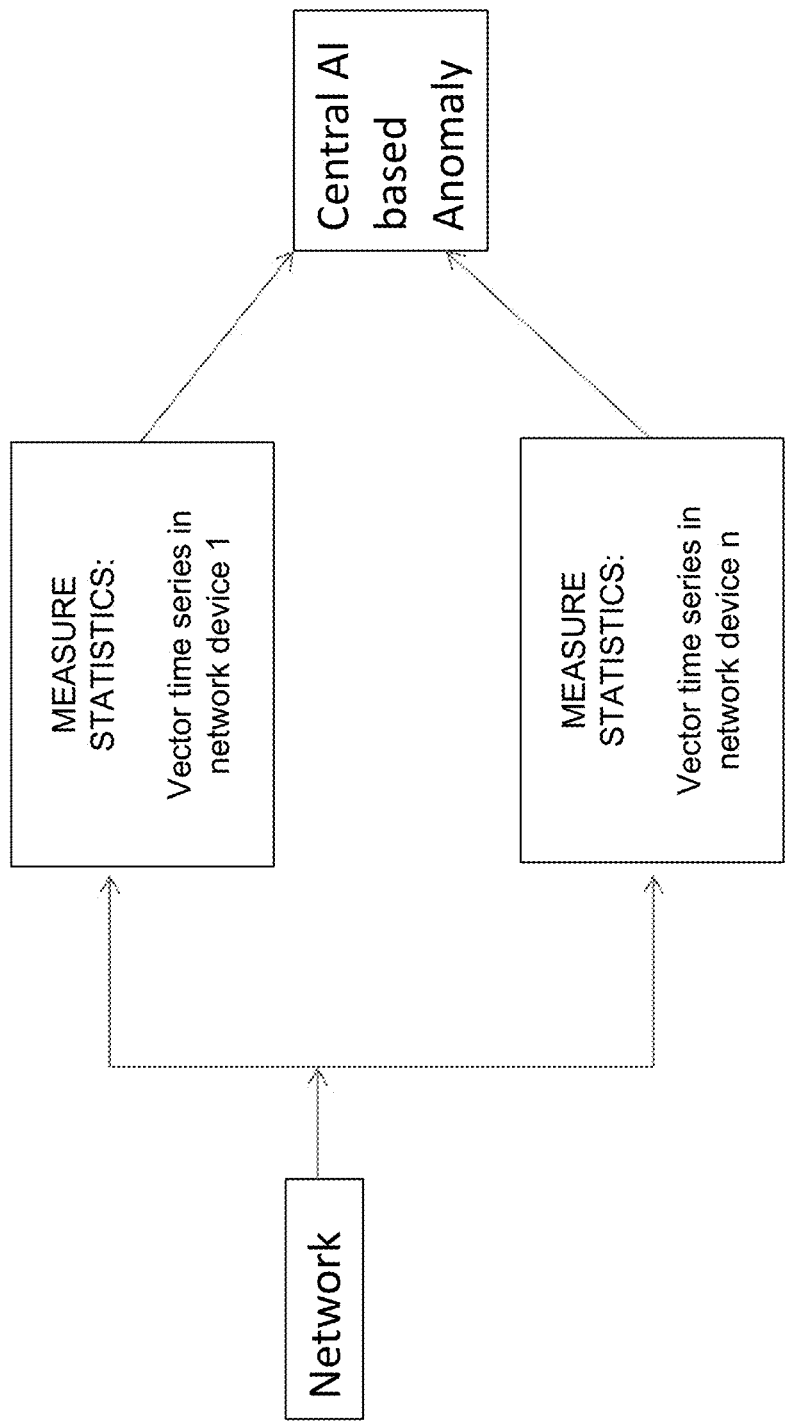
FIG. 9 is a conceptual diagram that illustrates an example operation flow to detect a network anomaly, in accordance with one or more techniques of this disclosure.

FIG. 9 is a conceptual diagram that illustrates an example operation flow to detect a network anomaly, in accordance with one or more techniques of this disclosure. In this example, the measurements are provided to a central location to do the anomaly detection. In FIG. 9, n different network devices collect statistics. These n network devices provide the statistics to a central location to perform anomaly detection. The statistics from the n network devices may be aggregated and then analyzed as discussed above to detect an anomaly.

Figure 10:
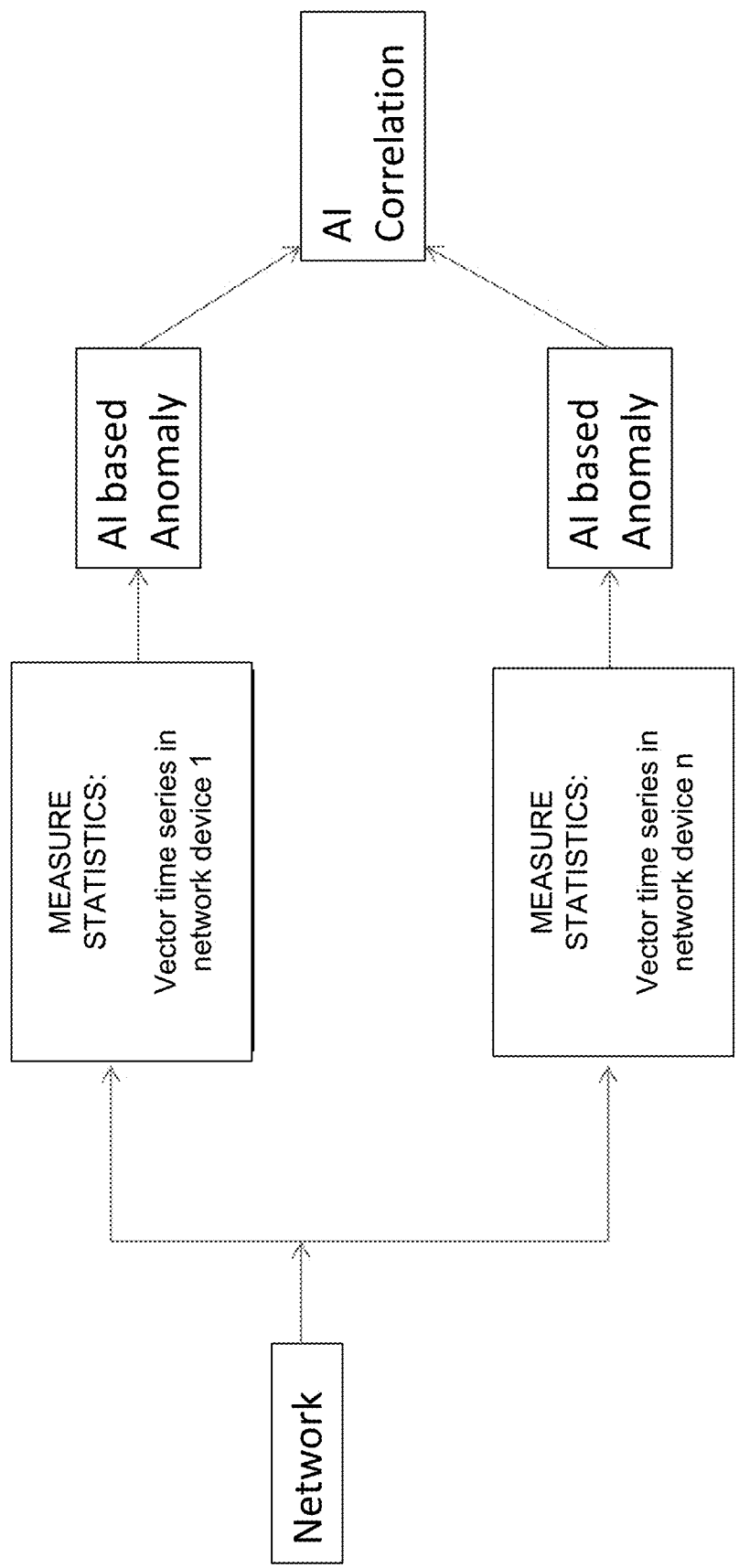
FIG. 10 is a conceptual diagram that illustrates an example operation flow to detect a network anomaly using distributed network anomaly detection, in accordance with one or more techniques of this disclosure.

FIG. 10 is a conceptual diagram that illustrates an example operation flow to detect a network anomaly using distributed network anomaly detection, in accordance with one or more techniques of this disclosure. In the example of FIG. 10 the computation is done in a distributed manner may take place in multiple network devices as distributed computing rather than all done in a central cloud based computing servers.

In FIG. 10, n different network devices collect statistics. These n network devices may then do anomaly detection based on the local statistics from the network device. As discussed above, this may have computational disadvantages. Alternately, the statistics may be sent to a number of other locations for anomaly detection. Thereafter, a centralized correlation may also be done.

Figure 11:
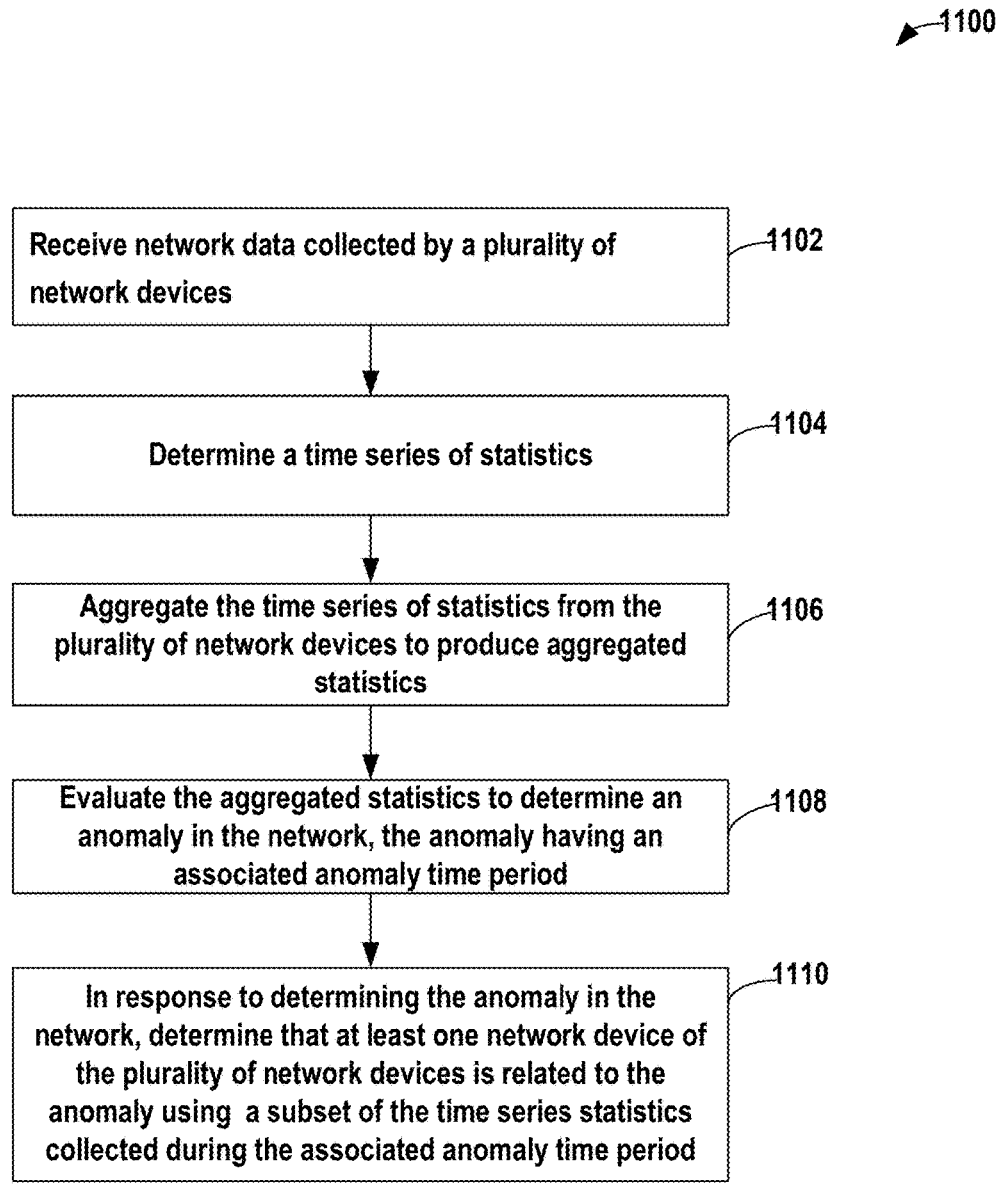
FIG. 11 is a flow chart illustrating an example operation to detect a network anomaly, in accordance with one or more techniques of this disclosure.

FIG. 11 is a flow chart illustrating an example operation to detect a network anomaly in accordance with one or more techniques of this disclosure. NMS 130 may receive from a plurality of network devices in a network, network data collected by the plurality of network devices. (1102) such as switches, routers, load balancers, etc. NMS 130 may determine, from the network data, a time series of statistics (1104). NMS 130 may aggregate the time series of statistics from the plurality of network devices to produce aggregated statistics (1106). NMS 130 may evaluate the aggregated statistics to determine an anomaly in the network, the anomaly having associated anomaly time period (1108). NMS 130 may, in response to determining the anomaly in the network, determining that at least one network device of the plurality of network devices is related to the anomaly using a subset of the time series statistics collected during the associated anomaly time period (1110).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
receiving, at a computing device from a plurality of network devices in a network, network data collected by the plurality of network devices;
determining, from the network data, a time series of statistics for each of the plurality of network devices;
aggregating, at the computing device, the time series of statistics for each of the plurality of network devices to produce an aggregated time series of statistics;
detecting, at the computing device, an anomaly in the network based on the aggregated time series of statistics, the anomaly having an associated anomaly time period; and
determining, at the computing device, that a first network device of the plurality of network devices is related to the anomaly using a temporal method that uses curves of statistics within the associated anomaly time period to determine that a curve of the time series of statistics for the first network device is more correlated to a curve of the aggregated time series of statistics than curves of the time series of statistics for other network devices of the plurality of network devices within the associated anomaly time period.

2. The method of claim 1, further comprising determining an action to take with respect to the first network device of the plurality of network devices.

3. The method of claim 2, wherein determining the action to take includes using one or more supervised machine learning models to determine the action to take.

4. The method of claim 2, wherein determining the action to take includes one or more of changing a configuration of the first network device of the plurality of network devices, changing a software version of the first network device, or restarting the first network device or a component of the first network device.

5. The method of claim 1, wherein detecting the anomaly includes:
determining a predicted aggregated time series of statistics using the time series of statistics; and determining that the aggregated time series of statistics is outside a normal range based on the predicted aggregated time series of statistics.

6. The method of claim 1 wherein detecting the anomaly includes using one or more unsupervised machine learning models to detect the anomaly.

7. A computing device comprising:
a memory; and
one or more processors coupled to the memory and configured to:
receive, from a plurality of network devices in a network, network data collected by the plurality of network devices,
determine, from the network data, a time series of statistics for each of the plurality of network devices,
aggregate the time series of statistics for each of the plurality of network devices to produce an aggregated time series of statistics,
detect an anomaly within the network based on the aggregated time series of statistics, the anomaly having an associated anomaly time period, and
determine that a first network device of the plurality of network devices is related to the anomaly using a temporal method that uses curves of statistics within the associated anomaly time period to determine that a curve of the time series of statistics for the first network device is more correlated to a curve of the aggregated time series of statistics than curves of the time series of statistics for other network devices of the plurality of network devices within the associated anomaly time period.

8. The computing device of claim 7, wherein the one or more processors are further configured to determine an action to take with respect to the first network device of the plurality of network devices.

9. The computing device of claim 8, wherein to determine the action to take, the one or more processors are configured to use one or more supervised machine learning models to determine the action to take.

10. The computing device of claim 8, wherein to determine the action to take, the one or more processors are further configured to one or more of change a configuration of the first network device of the plurality of network devices, change a software version of the first network device, or restart the first network device or a component of the first network device.

11. The computing device of claim 7, wherein to detect the anomaly, the one or more processors are further configured to:
determine a predicted aggregated time series of statistics using the time series of statistics; and determine that the aggregated time series of statistics is outside a normal range based on the predicted aggregated time series of statistics.

12. The computing device of claim 7 wherein to detect the anomaly, the one or more processors are configured to use one or more unsupervised machine learning models to detect the anomaly.

13. A non-transitory computer-readable storage medium having instructions stored thereon that, when executed, cause one or more processors to:
receive from a plurality of network devices in a network, network data collected by the plurality of network devices,
determine, from the network data, a time series of statistics for each of the plurality of network devices,
aggregate the statistics for each of the plurality of network devices to produce an aggregated time series of statistics,
detect an anomaly within the network based on the aggregated time series of statistics, the anomaly having an associated anomaly time period, and
determine that a first network device of the plurality of network devices is related to the anomaly using a temporal method that uses curves of statistics within the associated anomaly time period to determine that a curve of the time series of statistics for the first network device is more correlated to a curve of the aggregated time series of statistics than curves of the time series of statistics for other network devices of the plurality of network devices within the associated anomaly time period.

14. The non-transitory computer-readable storage medium of claim 13, wherein the instructions cause the one or more processors to determine an action to take with respect to the first network device of the plurality of network devices.

15. The non-transitory computer-readable storage medium of claim 14, wherein to determine the action to take, the instructions cause the one or more processors to use one or more supervised machine learning models to determine the action to take.

16. The non-transitory computer-readable storage medium of claim 14, wherein to determine the action to take, the instructions cause the one or more processors to one or more of change a configuration of the first network device of the plurality of network devices, change a software version of the first network device, or restart the first network device or a component of the first network device.

* * * * *